(12) United States Patent
Chittenden et al.

(10) Patent No.: US 11,633,819 B1
(45) Date of Patent: Apr. 25, 2023

(54) O-RING INSTALLATION TOOL AND METHOD OF INSTALLING AN O-RING IN AN INNER DIAMETER

(71) Applicant: Caterpillar Inc., Peoria, IL (US)

(72) Inventors: Jonathan R. Chittenden, West Lafayette, IN (US); Andrew D. Rockwell, Marana, AZ (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 17/538,649

(22) Filed: Nov. 30, 2021

(51) Int. Cl.
  *B23P 19/08* (2006.01)
  *B25B 27/00* (2006.01)
  *B23P 19/04* (2006.01)

(52) U.S. Cl.
  CPC ........ *B23P 19/084* (2013.01); *B25B 27/0028* (2013.01); *B23P 19/047* (2013.01); *B25B 27/0092* (2013.01); *Y10T 29/53657* (2015.01); *Y10T 29/53891* (2015.01); *Y10T 29/53987* (2015.01)

(58) Field of Classification Search
  CPC .. B23P 19/084; B23P 19/047; B25B 27/0028; B25B 27/0092; Y10T 29/53657; Y10T 29/53987; Y10T 29/53891
  See application file for complete search history.

(56) References Cited

U.S. PATENT DOCUMENTS

| | | | |
|---|---|---|---|
| 4,141,129 | A | 2/1979 | Martini |
| 6,108,884 | A | 8/2000 | Castleman et al. |
| 6,421,897 | B1 | 7/2002 | Amaral et al. |
| 10,870,190 | B2 | 12/2020 | DeMaria |
| 2017/0209968 | A1 | 7/2017 | Mizumoto et al. |

FOREIGN PATENT DOCUMENTS

| | | | | |
|---|---|---|---|---|
| CN | 106239423 A | 12/2016 | | |
| DE | 102008026809 A1 | 12/2009 | | |
| EP | 253750 A | * 1/1988 | ......... | B25B 27/0028 |

* cited by examiner

*Primary Examiner* — Jermie E Cozart

(74) *Attorney, Agent, or Firm* — Leydig, Voit & Mayer, Ltd

(57) ABSTRACT

Tool for installing O-rings in an inner diameter of a structure includes a plurality of held in a spaced, fixed parallel relationship to one another. A plurality of guide surfaces are secured with and disposed between the plates. A selectively-actuable finger actuator is disposed to move a plurality of fingers generally radially between the plurality of plates. Each of the plates includes a slot, and a loading pin is configured to be received within the slots. When at least one O-ring is disposed about a plurality of guide surfaces proximal the periphery of the plates, and the loading pin is moved within the slots, the loading pin pulls a loop of the O-rings toward the plate axis. When the loading pin is removed, the finger actuator may be actuated to move the fingers in the generally radial direction to move the at least one O-ring radially outward from the plates.

19 Claims, 6 Drawing Sheets

O-RING INSTALLATION TOOL AND METHOD OF INSTALLING AN O-RING IN AN INNER DIAMETER

TECHNICAL FIELD

This patent disclosure relates generally to tools for installing an O-ring, and, more particularly to tools for installing and methods of installing one or more O-rings in an inner diameter location.

BACKGROUND

Installing O-rings requires practice and is a time-consuming task, even for experienced operators. While installing O-rings on an outer diameter of a shaft is generally accomplished using readily available tools, installing O-rings into an inner diameter of a housing or other structure is a challenging endeavor. Because the inner diameter of a housing is not generally readily accessible or visible, it is difficult to install such O-rings and to ensure accurate placement. While installing O-rings into grooves in an inner diameter of a housing is challenging, this task may be further complicated in housings that do not have grooves in the inner diameter. Such installations are subject to human error, which can be detrimental to the ultimate effectiveness of the O-rings once installed. Each of these challenges may be multiplied in installations including a plurality of O-rings placed along an inner diameter.

German patent disclosure DE 102008026809B4 is directed to a device for installing O-rings. The device includes a fixing shank having a longitudinally-extending recess. A pressurizing unit is used to press the O-rings into the recess. The shank may then be inserted into a channel and the pressurizing unit removed to release the O-rings.

SUMMARY

The disclosure describes, in one aspect, a tool for installing at least one O-ring in an inner diameter of a structure. The tool includes a plurality of plates that are disposed along a plate axis and held in a spaced, fixed parallel relationship to one another. Each plate has a peripheral surface and at least one slot opening to the peripheral surface. A plurality of guide surfaces secured with at least one of said plates and disposed between the plurality of plates. The plurality of guide surfaces are disposed proximal to the periphery of the at least one said plate. A plurality of fingers are movably coupled between the plurality of plates. The plurality of fingers include engagement surfaces disposed to move in a generally radial direction relative to the plurality of plates. A selectively-actuable finger actuator is disposed to engage the plurality of fingers to selectively move the engagement surfaces of the plurality of fingers generally radially relative to the plurality of plates. A loading pin including a pin axis is configured to be received within the at least one slot of the plurality of plates with the pin axis generally parallel to the plate axis. The loading pin is then movable in the at least one slot while maintaining the pin axis generally parallel to the plate axis. When the at least one O-ring is disposed about the plurality of guide surfaces between the plurality of plates and the loading pin is moved within the at least one slot, the loading pin pulls a loop of the at least one O-ring toward the plate axis. When the loading pin is removed in an axial direction and the finger actuator is actuated, the finger actuator moves the engagement surfaces of the plurality of fingers in the generally radial direction relative to the plurality of plates to move the at least one O-ring radially outward from the plates.

In another aspect, the disclosure relates to a method of installing at least one O-ring in an inner diameter of a structure utilizing the tool. The method includes disposing at least one O-ring along the guide surfaces between two of the plurality of plates; positioning the loading pin within the slots of the plurality of plates from the periphery of the plurality of plates and moving the loading pin within the slots while maintaining the pin axis and the plate axis generally parallel to pull a loop of the at least one O-ring toward the plate axis; removing the loading pin in an axial direction; and actuating the selectively-actuable finger actuator to move the engagement surfaces of the plurality of fingers in the generally radial direction relative to the plurality of plates to move the at least one O-ring radially outward from the plates.

In yet another aspect, the disclosure relates to a method of manufacturing the tool for installing at least one O-ring in an inner diameter of a structure. The method includes pivotably coupling the plurality of fingers to the selectively-actuable finger actuator; disposing the plurality of fingers adjacent a first of the plurality of plates; disposing a second of the plurality of plates parallel to the first of the plurality of plates and proximal to the plurality of fingers with the slot of the first plate disposed in alignment with the slot of the second plate; and securing the first and second of the plurality of plates together.

BRIEF DESCRIPTION OF THE DRAWING(S)

DETAILED DESCRIPTION

This disclosure relates to a tool 100 and method of installing one or more O-rings 96 in an inner diameter location 98 in a housing or other structure. For the purposes of this disclosure, the term "housing" will be used to describe any structure including an inner diameter in which an O-ring may be installed. The inner diameter 98 of the housing is identified generally as 98 in the figures (see e.g., FIG. 5). The inner diameter location 98 may be an annular surface that may or may not include one or more grooves.

Figure 1:
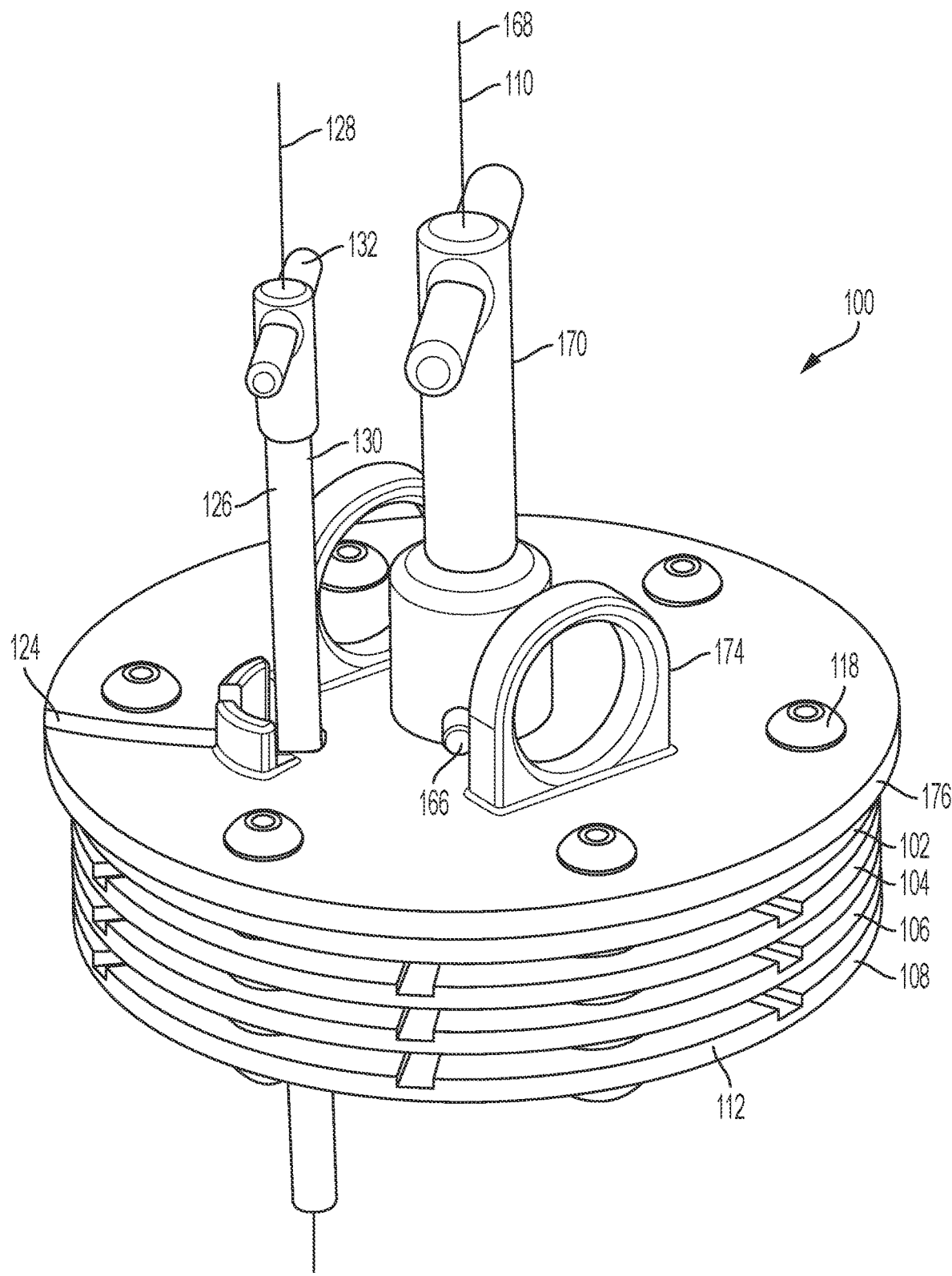
FIG. 1 is an isometric view of a top and side of an O-ring installation tool in accordance with teachings of this disclosure.
Figure 2:
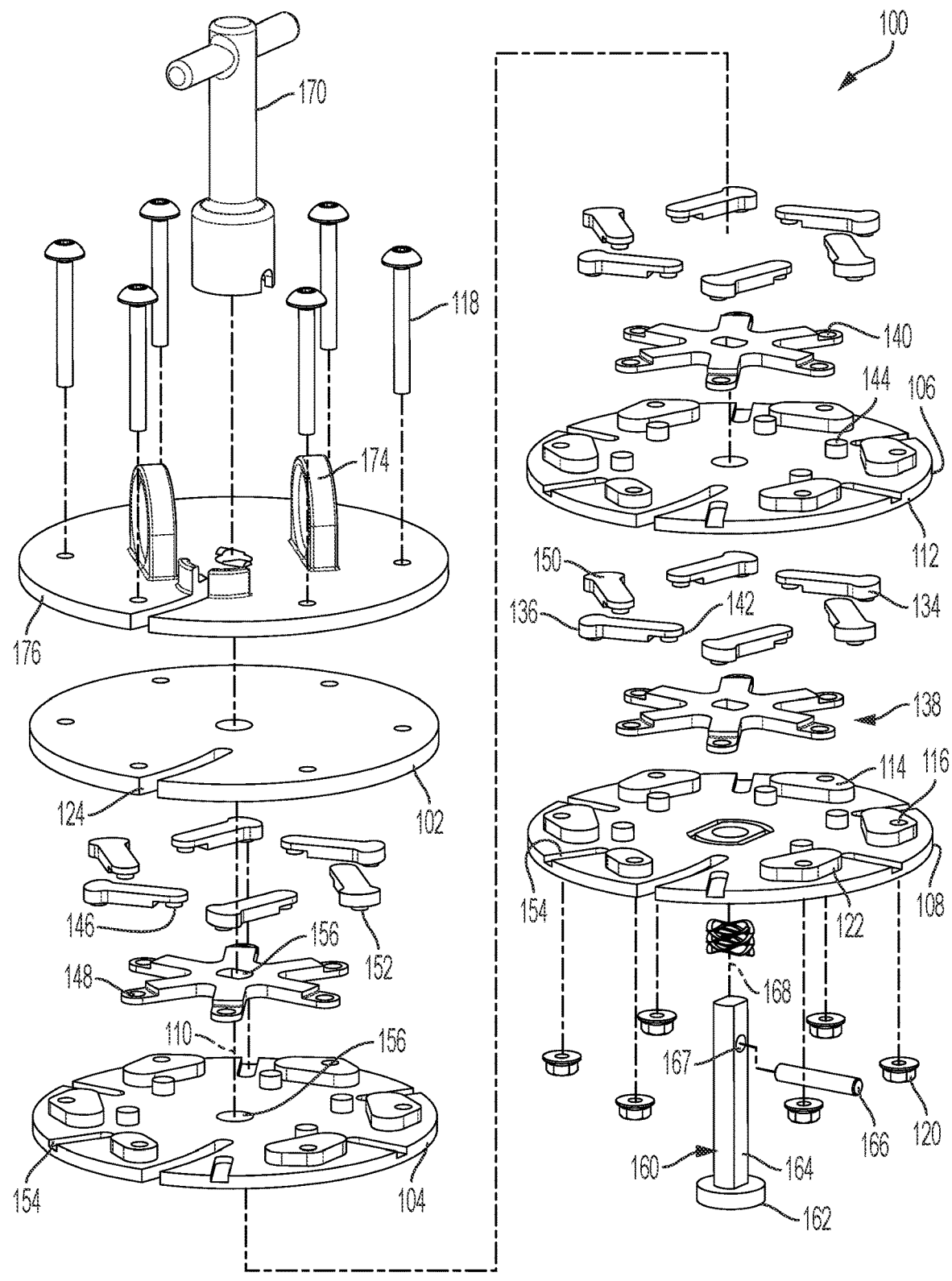
FIG. 2 is an exploded isometric view of the tool of FIG. 1.

Referring to FIGS. 1 and 2, the tool 100 includes a plurality of plates 102, 104, 106, 108 disposed along a plate axis 110 (see FIG. 2) in a parallel relationship. Each of the plates 102, 104, 106, 108 includes a peripheral surface 112. In order to maintain the plates 102, 104, 106, 108 in a spaced, fixed parallel relationship to one another, at least one plate guide 114 is provided between adjacently disposed plates 102, 104, 106, 108. The at least one plate guide 114 is secured with at least one of said plates 102, 104, 106, 108

(plates 104, 106, 108 in the illustrated embodiment) such that the at least one plate guide 114 is disposed between each pair of plates 102, 104, 106, 108. In the illustrated embodiment, a plurality of plate guides 114 are provided between each pair of plates 102, 104, 106, 108. The plate guides 114 may be unitarily formed with a plate 102, 104, 106, 108, or may be otherwise secured to a plate 102, 104, 106, 108. In the illustrated embodiment, the plate guides 114 are unitarily formed with each of plates 104, 106, 108. It will be appreciated, however, that plate guides 114 could alternatively be coupled to both the top and bottom surfaces of one or more of the plates. Those of skill in the art will appreciate that the plate guides 114 are disposed to maintain the plates 102, 104, 106, 108 in a parallel relationship, providing a set distance between the plates 102, 104, 106, 108.

In order to maintain the plates 102, 104, 106, 108 in a fixed relationship, a coupling arrangement may be provided. While an alternate coupling arrangement may be provided, in the illustrated embodiment, the plates 102, 104, 106, 108 are provided with a plurality of bores 116 through which a plurality of elongated fasteners 118 are received. In this embodiment, the plurality of bores 116 likewise extend through the plate guides 114. Those of skill in the art will appreciate that this placement may provide additional stability to the tool 100. The elongated fasteners 118 are bolts that are received through the bores 116 and are maintained in position by a plurality of nuts 120 or the like. While the coupling arrangement of the illustrated embodiment includes a plurality of fasteners 118 extending through bores 116, an alternative arrangement may be provided, such as interlocking elements between the plates 102, 104, 106, 108.

In use, one or more O-rings 96 may be coupled with the tool 100 in an insertion position. To hold the O-rings 96 in position for installation into an inner diameter location 98, the tool 100 further includes a plurality of guide surfaces 122 that are disposed proximal to the periphery of the plates 102, 104, 106, 108. While separate surfaces may be provided, in the illustrated embodiment, the guide surfaces 122 are provided along the plate guides 114.

Referring to FIGS. 1-4, each of the plates 102, 104, 106, 108 is provided with at least one slot 124 that opens to the peripheral surface 112 of the plate 102, 104, 106, 108. The slots 124 of plates 102, 104, 106, 108 are aligned. The arrangement is further provided with a loading pin 126 having a loading pin axis 128. The loading pin 126 may be of any appropriate design. In the illustrated embodiment, that loading pin 126 is in the form of a rod 130 having a handle 132 at the proximal end of the rod 130.

In use, the loading pin 126 may be received within the slots 124 of the plates 102, 104, 106, 108 with the pin axis 128 generally parallel to the plate axis 110. The loading pin 126 may then be moved within the slots 124 while maintaining the pin axis 128 generally parallel to the plate axis 110. While the slots 124 of the illustrated embodiment are extend generally radially within the plates 102, 104, 106, 108, the slots 124 may alternatively or additionally extend in an arcuate pattern, for example.

Figure 3:
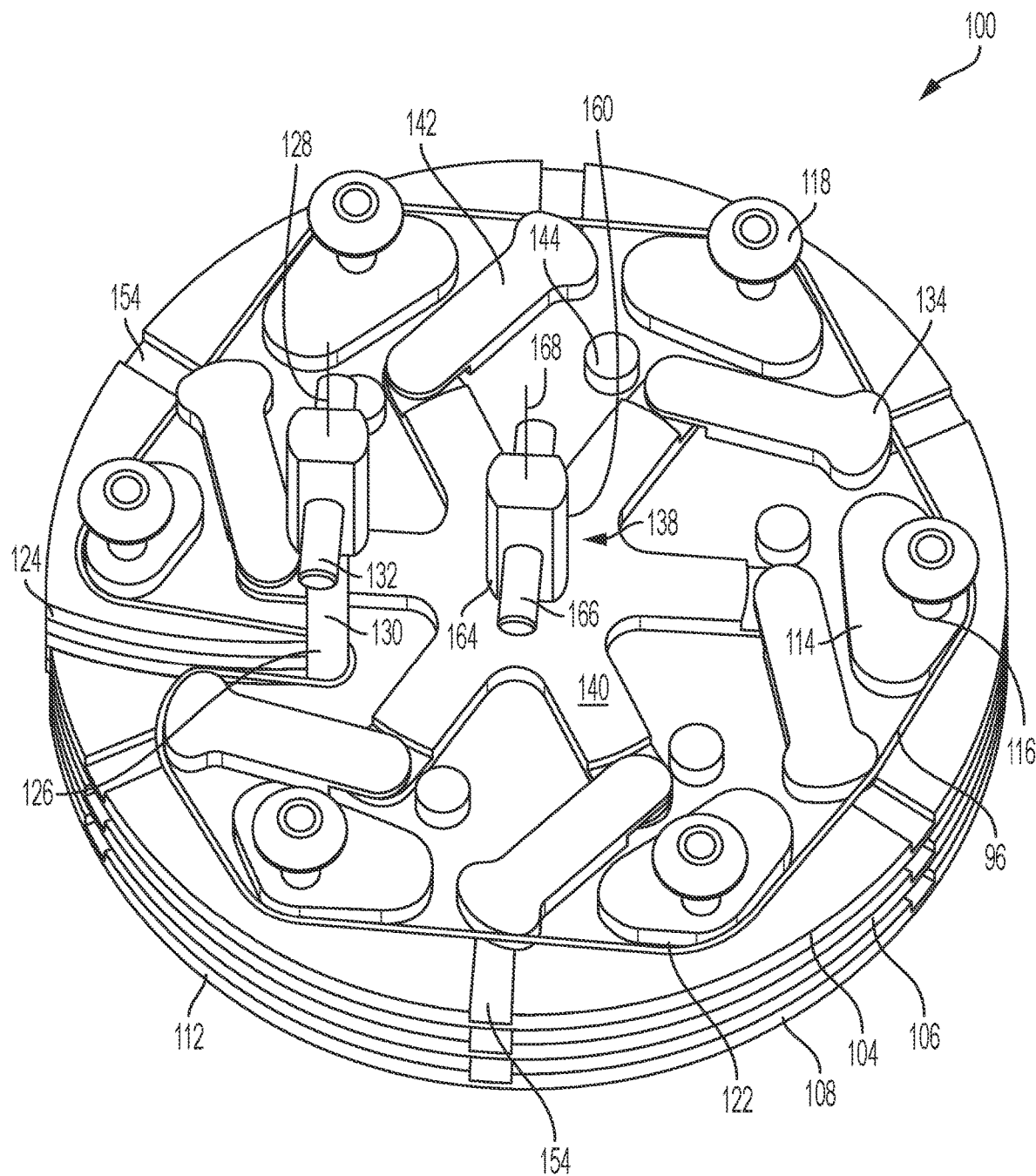
FIG. 3 is a fragmentary isometric view of the tool of FIGS. 1 and 2 with an O-ring in an insertion position.
Figure 4:
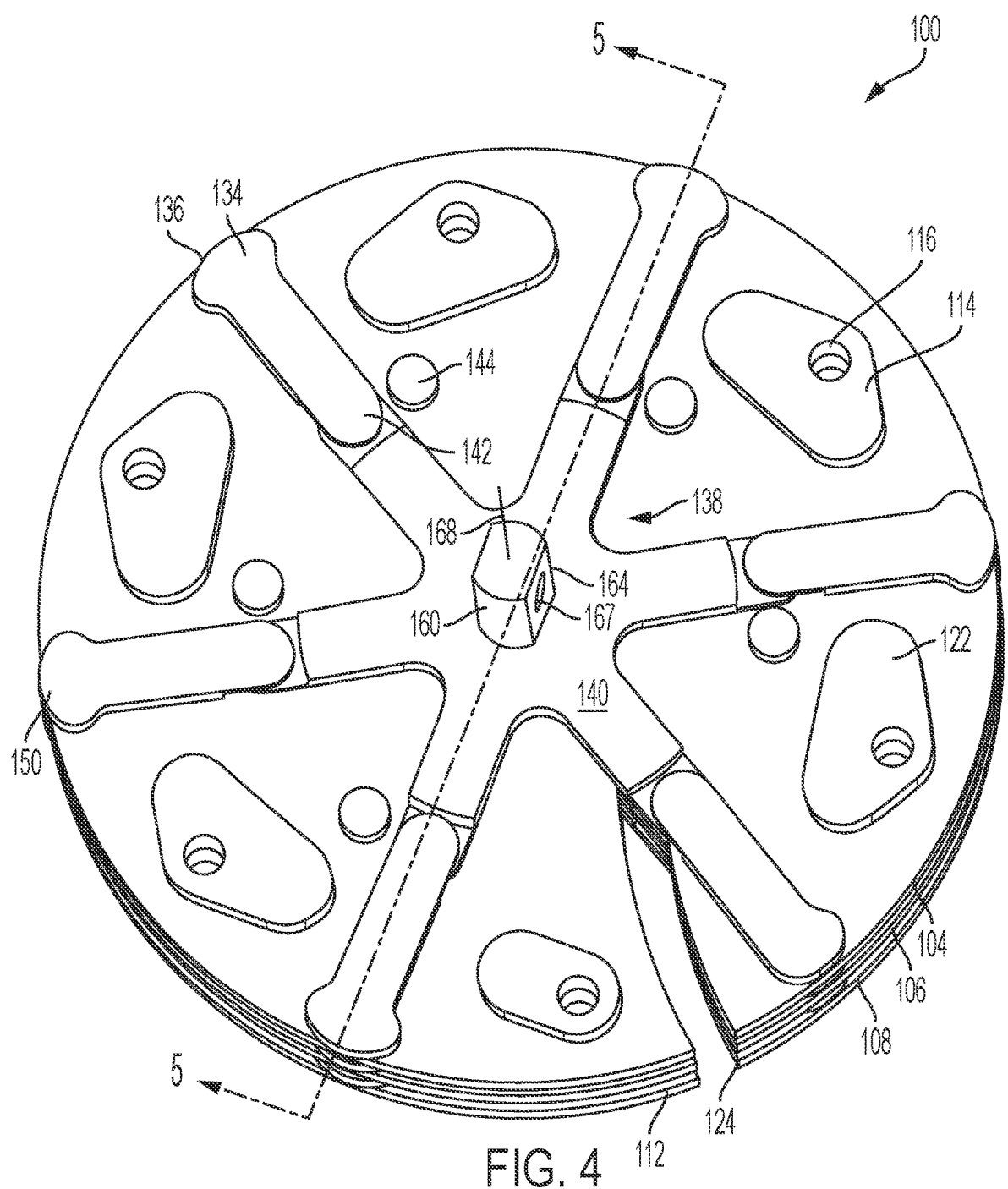
FIG. 4 is a fragmentary isometric view of the tool of FIGS. 1-3 with the fingers in an installation position.

Referring to FIG. 3, in order to place one or more O-rings 96 in an insertion position within the tool 100, the O-ring 96 is disposed at a position between the plates 102, 104, 106, 108. The loading pin 126 is then positioned and moved within the slots 124, drawing a loop of the O-ring 96 to a tucked position between the plates 102, 104, 106, 108, while drawing the O-ring 96 against the guide surfaces 122 proximal to the periphery of the plates 102, 104, 106, 108. In this insertion position, the plurality of plates 102, 104, 106, 108 with the loaded O-ring(s) 96 may be advanced to a position adjacent the inner diameter location 98. In this embodiment, the O-ring(s) are contained entirely between the plates 102, 104, 106, 108. With the O-ring(s) 96 in the insertion position, the loading pin 126 may be removed from the tool 100, for example, by sliding the loading pin 126 out of the slots 124 in the direction of the loading pin axis 128. While the loading pin 126 may be removed prior to or after advancing the tool 100 to a position within the inner diameter location 98, maintaining the loading pin 126 with the plates 102, 104, 106, 108 until the tool 100 is in position within the inner diameter location 98 may ensure that the O-rings 96 are maintained in the insertion position.

Figure 6:
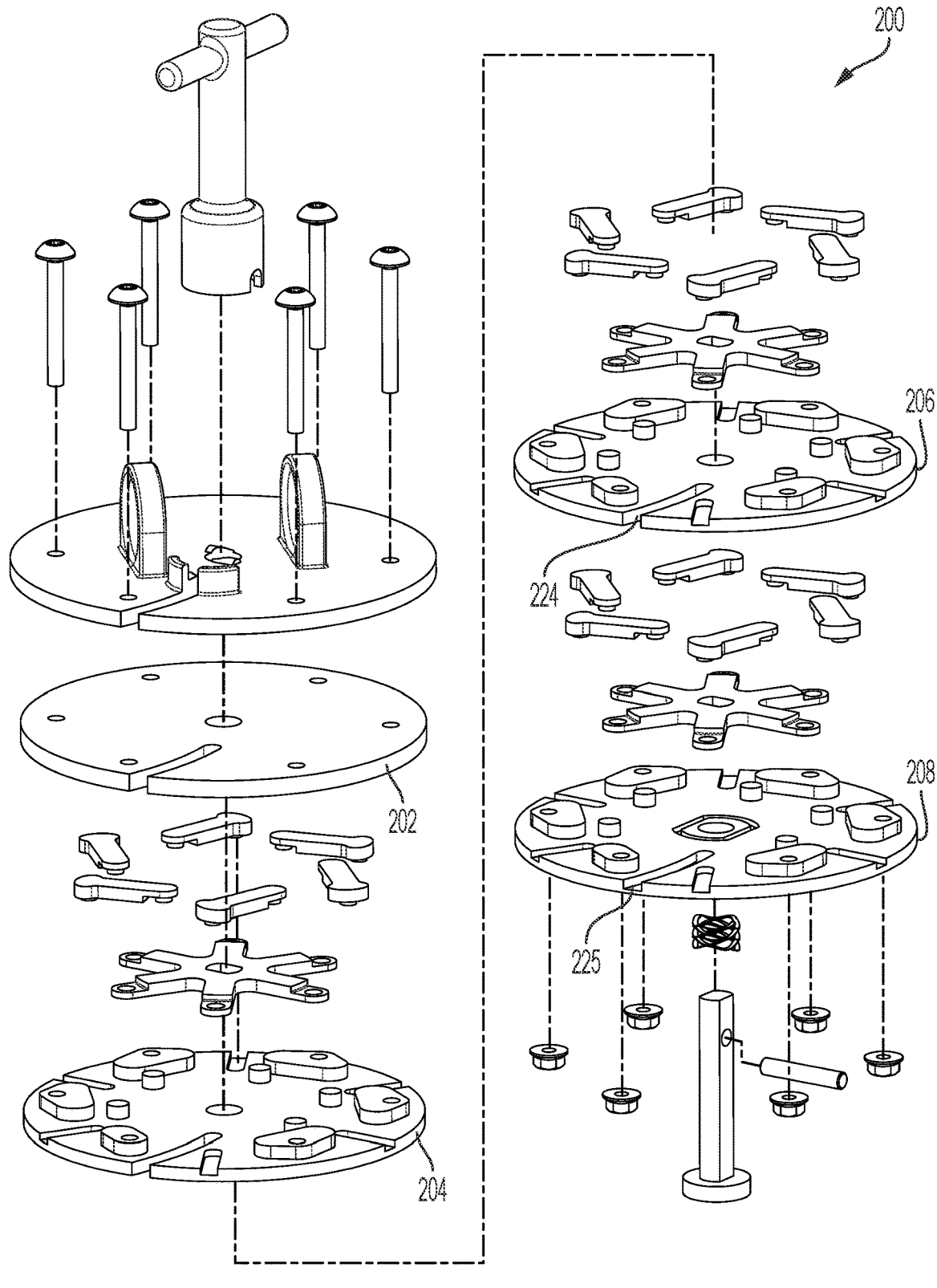
FIG. 6 is an exploded isometric view of an alternative embodiment of an O-ring installation tool.

In the illustrated embodiment, the slots 124 of the plates 102, 104, 106, 108 extend completely through the plates 102, 104, 106, 108 from the top surface to the bottom surface. It will be appreciated, however, that in an alternative embodiment of the tool 200 illustrated in FIG. 6, the slot 225 of the lowermost plate 208 does not extend entirely through the lowermost plate 208. Rather, the slot 225 is in the form of an elongated recess or channel. In this way, the distal end of a loading pin may extend through the slots 224 in the remaining plates 202, 204, 206 and be positioned in and slide along the elongated recess slot 225 of the lowermost plate 208 as the loading pin. While not illustrated in FIG. 6, the loading pin may be of any appropriate design, such as, for example, the same as or similar to the loading pin 126 of FIG. 1.

Thus, in order to engage one or more O-rings 96 with the tool, the at least one O-ring 96 may be disposed about the plurality of guide surfaces 122 between the plurality of plates 102, 104, 106, 108. The loading pin 126 may then be moved within the at least one slot 124 such that the loading pin 126 pulls a loop of the at least one O-ring 96 toward the plate axis 110 to a tucked position.

Returning to the embodiment of FIGS. 1-5, in order to advance the O-ring(s) 96 to an installation position in an inner diameter location 98, the tool includes a plurality of fingers 134, which are movably coupled between the plurality of plates 102, 104, 106, 108. The plurality of fingers 134 include engagement surfaces 136 generally at the distal ends 150 of the fingers 134. The engagement surfaces 136 of the fingers 134 are disposed to move in a generally radial direction relative to the plurality of plates 102, 104, 106, 108. In this way, the engagement surfaces 136 of the plurality of fingers 134 to engage the O-ring(s) 96 and push them in a generally outward direction outward from the plurality of plates 102, 104, 106, 108.

In order to cause movement of the plurality of fingers 134, the tool 100 includes a selectively-actuable finger actuator (shown generally as 138). The finger actuator 138 disposed to engage the plurality of fingers 134 to selectively move the engagement surfaces 136 of the plurality of fingers 134 generally radially relative to the plurality of plates 102, 104, 106, 108. In the illustrated embodiment, the finger actuator 138 includes at least one pivotably-mounted plate 140 that engages with proximal ends 142 of the plurality of fingers 134 to move the engagement surfaces 136 of the fingers 134 in a generally outward direction. In order to limit the pivoting motion of the pivotably-mounted plate 140, one or more stops 144 may be provided. The stops 144 may include interference surfaces such that the pivotably-mounted plate 140 may be rotated only a limited distance in one or the other of the pivoting directions.

While an alternative arrangement may be provided, the proximal ends 142 of the fingers 134 may be pivotably coupled to the pivotably-mounted plate 140. Any pivotable mounting arrangement may be provided. For example, one of the pivotably-mounted plate 140 and the proximal ends of the fingers 134 may include protrusions 146, which may engaged recesses or bores 148 in the other of the pivotably-mounted plate 140 and the proximal ends of the fingers 134. In the illustrated embodiment, the proximal ends of the fingers 134 each include a protrusion 146, while the pivotably-mounted plate 140 includes a plurality of recesses or bores 148, which receive the protrusions 146.

In order to guide the distal ends 150 of the fingers 134, a similar guiding arrangement may be provided. For example, one of the distal ends 150 of the fingers 134 and the plates 102, 104, 106, 108 may include a protrusion 152, while the other of the fingers 134 and the plates 102, 104, 106, 108 includes a channel 154, which guides the motion of the protrusions 152. In the illustrated embodiment, the distal ends 150 of the plurality of fingers 134 each include a protrusion 152, while the plates 102, 104, 106, 108 include a plurality of generally radially extending channels 154 which receive the protrusions 152 of the fingers 134. As the pivotably-mounted plate 140 provides movement to the plurality of fingers 134, the protrusions 152 of the distal ends 150 of the fingers 134 are guided by the channels 154 to move the distal ends 150 of the fingers 134 in a generally radial direction. In this way, as the pivotably-mounted plate 140 pivots, the engagement surfaces 136 of the fingers 134 are moved radially outward to move the O-rings 96 outward from the tool 100, or radially inward to retract the fingers 134 to a position between the plates 102, 104, 106, 108.

Each of the plates 102, 104, 106, 108 includes a central bore 156, and each of the pivotably-mounted plates 140 includes a central bore 158 (see FIG. 2). In order to provide a pivoting movement to the pivotably-mounted plates 140, an actuating shaft 160 is provided. While any appropriate design may be provided, the illustrated embodiment includes an enlarged head 162 and an elongated shaft 164. The elongated shaft 164 extends through the central bores 156, 158 of the plates 102, 104, 106, 108 and the pivotably mounted plates 140, and it held in position by a dowel pin 166 that extends through a transversely disposed bore 167 the elongated shaft 164.

The elongated shaft 164 of the actuating shaft 160 is coupled with the pivotably-mounted plates 140 such that axial rotation or pivoting of the actuating shaft 160 results in a pivoting motion of the pivotably-mounted plates 140. While any appropriate coupling arrangement may be utilized, in the illustrated embodiment, the cross-sections of the elongated shaft 164 of the actuating shaft 160 and the pivotably-mounted plates 140 are configured to engage such that rotation about an axis 168 of the actuating shaft 160 provide an associated rotation or pivoting of the pivotably-mounted plates 140. Significantly, however, the cross-section of the actuating shaft 160 is not configured to securely engage with the central bores 156 of the plates 102, 104, 106, 108. As a result, the actuating shaft 160 is free to pivot relative to the central bores 156 of the plates 102, 104, 106, 108.

In order to axially pivot the actuating shaft 160, a handle 170 may be provided. In the illustrated embodiment, the handle 170 surrounds a proximal end of the actuating shaft 160, engaging with the dowel pin 166 such that rotation of the handle 170 about the axis 168 of the actuating shaft 160 rotates the actuating shaft 160 and the coupled pivotably-mounted plates 140. While the handle 170 may be permanently engaged with the actuating shaft 160, the handle 170 of the illustrated embodiment is removable.

Figure 5:
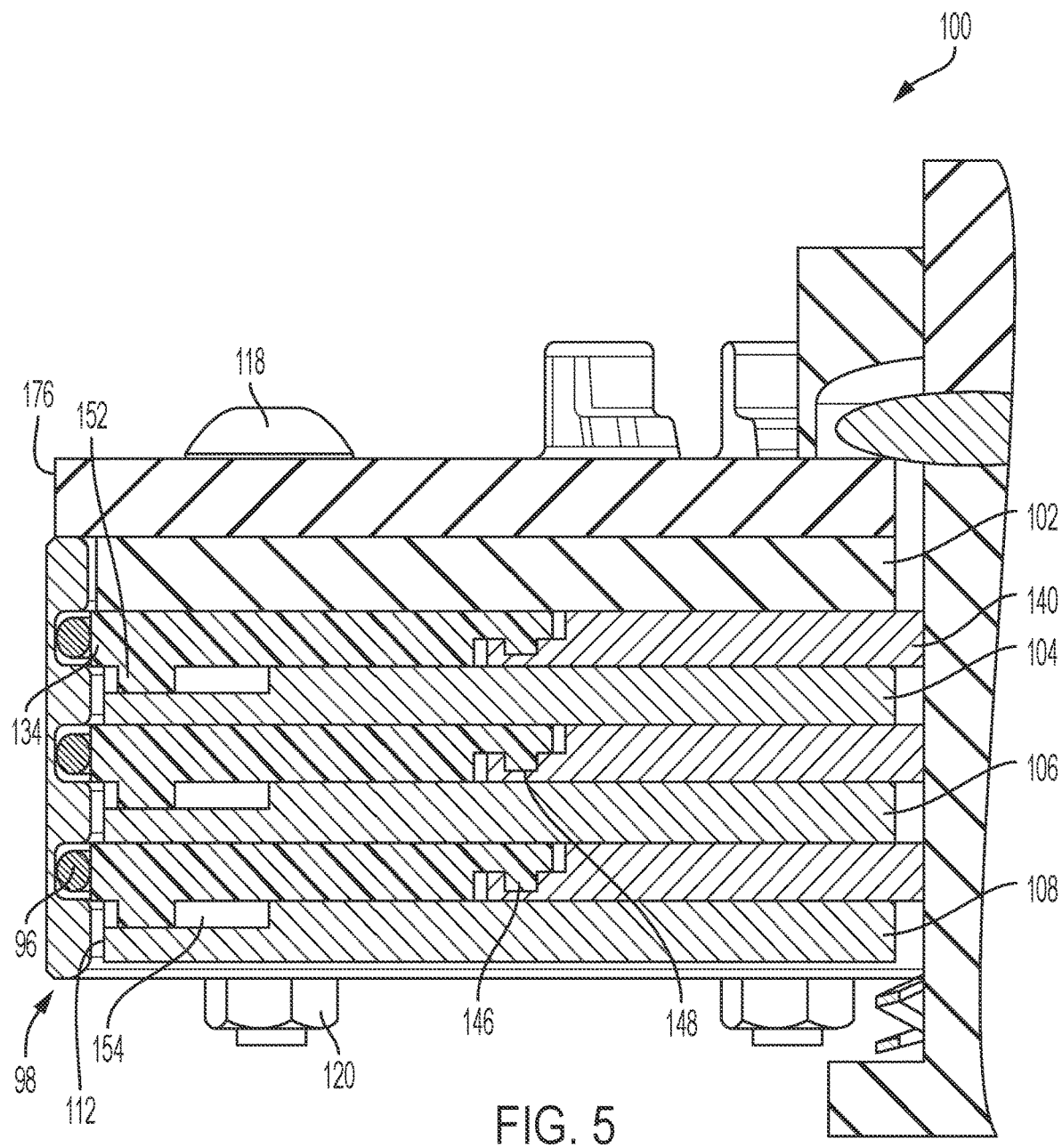
FIG. 5 is a fragmentary cross-sectional view of the tool of FIGS. 1-4 with fingers in an installation position and a plurality of O-rings installed in an inner diameter location.

In order to facilitate positioning of the tool 100 for placement of the O-rings 96, the tool may be provided with one or more placement handles 174 disposed, for example, along an upper surface of the tool 100. In order to further facilitate placement, the tool 100 may be provided with a limiting plate 176 that is sized to limit movement of the tool 100 in a given application. For example, the limiting plate 176 may be provided along an upper surface of the tool 100 and may be slightly larger than the plurality of plates 102, 104, 106, 108. In this way, as the tool 100 is lowered into an inner diameter location 98, the limiting plate 176 may engage a surface to limit the distance that the tool may travel, thereby facilitating accurate placement of the O-ring(s) 96 in a given location in the inner diameter location 98. Referring to FIG. 5, for example, the tool 100 including O-rings 96 to be installed (see FIG. 3), is advanced until the limiting plate 176 engages an upper surface of the structure including the inner diameter location 98 (see FIG. 5). The loading pin 126 may then be axially removed from the plurality of plates 102, 104, 106, 108. The handle 170 may then be pivoted to actuate the finger actuator 138 to move the engagement surfaces 136 of the plurality of fingers 134 in the generally radial direction relative to the plurality of plates 102, 104, 106, 108 to move the at least one O-ring 96 radially outward from the plates 102, 104, 106, 108. That is, the actuating shaft 160 may then be pivoted to pivot the pivotably-mounted plates 140 to advance the plurality of fingers 134 to the position illustrated in FIG. 4 to install the O-ring(s) 96, as illustrated in FIG. 5. The actuating shaft 160 may then be pivoted in the opposite direction, if necessary, to disengage the plurality of fingers 134 from the O-rings 96, and the tool 100 may be removed in the axial direction.

While the illustrated tool 100 includes first, second, third, and fourth plates 102, 104, 106, 108 with first, second, and third sets of plate guides 114, guide surfaces 122, fingers 134, and pivotably-mounted plates 140 as part of a finger actuator 138, those of skill in the art will appreciate that the tool 100 may be constructed to include a greater or lesser number of plates 102, 104, 106, 108 and associated components to simultaneously install a greater or lesser number of O-rings 96.

INDUSTRIAL APPLICABILITY

The present disclosure is applicable to the placement of one or more O-rings 96 in an inner diameter location 98 in original equipment construction or service.

The disclosed O-ring installation tool 100 may be used to install one or more O-rings 96 in an inner diameter location 98 to provide more efficient and accurate placement of O-ring(s) 96 in an inner diameter than currently available. As a result, the disclosed tool 100 and method may result in savings in labor costs relative to original equipment manufacture and/or service, and may reduce the time required for placement of O-ring(s) 96 in an inner diameter location 98.

While the tool 100 illustrated includes a plurality of plates 102, 104, 106, 108 for simultaneously installing up to three O-rings 96, it will be appreciated that the tool 100 may be configured to simultaneously install a greater or lesser number of O-rings 96. Moreover, the tool 100 may be sized and configured as a dedicated tool 100 to for a specific inner diameter location 98.

It will be appreciated that the foregoing description provides examples of the disclosed system and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

We claim:

1. A tool for installing at least one O-ring along an inner diameter of a structure, the tool comprising:
   a plurality of plates disposed along a tool central axis, each plate having a peripheral surface and at least one slot extending inwardly from the peripheral surface, the plurality of plates being disposed in a spaced, fixed parallel relationship to one another;
   a plurality of O-ring engagement members movably coupled between the plurality of plates, each O-ring engagement member having an O-ring engagement surface-configured to engage a portion of an O-ring and being movable in a generally radial direction away from the tool central axis, the O-ring engagement members being movable between a loading position at which the O-ring engagement portion of each O-ring engagement member is spaced from the peripheral surfaces of the plates and an installation position at which the O-ring engagement portion of each O-ring engagement member is disposed adjacent the peripheral surfaces of the plates;
   an actuator, the actuator being operatively connected to each of the O-ring engagement members, the actuator being movable between a first position and a second position, whereby movement of the actuator simultaneously moves each O-ring engagement member between its loading position and installation position; and
   a loading pin having a pin axis, the loading pin being configured to be received within the at least one slot of the plurality of plates with the pin axis generally parallel to the tool central axis, the loading pin being movable in the at least one slot while maintaining the pin axis generally parallel to the tool central axis;
   such that when the at least one O-ring is disposed between the plurality of plates and the loading pin is laterally moved within the at least one slot, the loading pin pulls a loop of the at least one O-ring toward the tool central axis, and
   whereby removal of the loading pin in an axial direction along the pin axis and actuation of the actuator moves the O-ring engagement surfaces of the plurality of O-ring engagement members in the generally radial direction relative to the tool central axis to move the at least one O-ring radially outward to a position adjacent the peripheral surfaces of the plates.

2. The tool of claim 1 wherein the actuator includes a pivotably-mounted plate, whereby pivoting of the pivotably-mounted plate moves the plurality of O-ring engagement surfaces in the generally radial direction.

3. The tool of claim 2 wherein the pivotably-mounted plate is mounted along the tool central axis, and the tool further includes an actuating shaft configured to couple with the pivotably-mounted plate to selectively pivot the pivotably-mounted plate.

4. The tool of claim 2 wherein the plurality of O-ring engagement members are pivotably mounted with the pivotably-mounted plate.

5. The tool of claim 4 wherein at least one of the plurality of plates and the plurality of O-ring engagement members include respective elongated channels, and the other of the at least one of the plurality of plates and the plurality of O-ring engagement members includes a plurality of protrusions, the protrusions configured to engage the elongated channels whereby the engagement surfaces of the plurality of O-ring engagement members move in a generally radial direction relative to the tool central axis as the pivotably-mounted plate pivots about the tool central axis.

6. The tool of claim 1 including at least three plates disposed along the tool central axis and held in a spaced, fixed parallel relationship to one another, wherein the plurality of O-ring engagement members are disposed between a first and a second of said at least three plates, the tool further including:
   a second plurality of O-ring engagement members movably coupled between the second and third of said at least three plates, the second plurality of O-ring engagement members including O-ring engagement surfaces configured to engage a portion of a second O-ring and being movable in the generally radial direction away from the tool central axis;
   the actuator being operatively connected to each of the second O-ring engagement members;
   such that when the second O-ring is disposed between the second and third plates and the loading pin is laterally moved within the at least one slot, the loading pin pulls a portion of the second O-ring toward the tool central axis, and
   whereby removal of the loading pin along the pin axis and actuation of the actuator moves the O-ring engagement surfaces of the second plurality of fingers in the generally radial direction relative to the tool central axis to move the second O-ring radially outward to a position adjacent the peripheral surfaces of the plates.

7. The tool of claim 6 including at least four plates, and the tool includes a third plurality of O-ring engagement members, and the actuator being operatively connected to each of the third O-ring engagement members to selectively move the O-ring engagement surfaces of the third plurality of O-ring engagement members generally radially relatively to the tool central axis.

8. The tool of claim 1 including a plurality of stops disposed to limit a pivoting movement of the actuator.

9. The tool of claim 8 wherein the plurality of stops are coupled to at least one of said plates.

10. The tool of claim 1 further including a limiting member for assisting in placement of the tool, the limiting member extending radially further from the tool central axis than the peripheral surface of the plates and being configured to limit insertion of the tool into the inner diameter of the structure.

11. The tool of claim 10 wherein the limiting member comprises a limit plate, the limit plate being disposed in fixed relation to the plurality of plates, the limit plate having a larger radius than the plurality of plates.

12. The tool of claim 1 wherein the plurality of plates include a plurality of bores, and the plurality of plates are maintained in the fixed parallel relationship by a plurality of elongated fasteners extending through said bores.

13. A method of installing at least one O-ring in an inner diameter of a structure utilizing a tool having a tool central axis, the method comprising:
   disposing at least one O-ring between two spaced apart plates, the tool central axis extending through the O-ring;
   laterally displacing the at least one O-ring with a loading pin within slots of the two spaced apart plates from the peripheral surfaces of the two spaced apart plates and moving the loading pin within the slots while maintaining a pin axis of the loading pin and the tool central axis generally parallel to pull a loop of the at least one O-ring toward the tool central axis;
   axially inserting the loading pin into a hole in the tool to secure the loading pin relative to the two spaced apart plates;
   inserting the tool and the at least one O-ring loaded therein into the inner diameter of the structure;
   removing the loading pin in an axial direction from a first end of the tool; and
   manually rotating an actuator at the first end of the tool to move a plurality of O-ring engagement members operatively connected to the actuator such that an O-ring engagement surface of each O-ring engagement member moves in a generally radial direction relative to the the tool central axis to move the at least one O-ring radially outward and into engagement with the inner diameter of the structure.

14. The method of claim 13 wherein rotating the actuator includes pivoting at least one pivotably-mounted plate, whereby pivoting of the pivotably-mounted plate moves the O-ring engagement surface of each of the plurality of O-ring engagement members in the generally radially direction.

15. The method of claim 14 wherein pivoting at least one pivotably-mounted plate includes pivoting an actuating shaft about the tool central axis.

16. The method of claim 13 wherein rotating the actuator includes moving protrusions extending from distal ends of the O-ring engagement members within generally radially extending channels in at least one of the two spaced apart plates.

17. The method of claim 13 wherein inserting the tool includes moving the tool in a direction of the tool central axis until a limiting plate confronts the structure.

18. A method of manufacturing the tool for installing at least one O-ring in an inner diameter of a structure, the method including:
   pivotably coupling a plurality of fingers to a selectively-actuable finger actuator;
   disposing the plurality of fingers and selectively-actuable finger actuator adjacent a first of a plurality of plates, each of said plurality of plates having a peripheral surface and at least one slot opening to the peripheral surface;
   disposing a second of the plurality of plates parallel to the first of the plurality of plates and proximal to the plurality of fingers with the slot of the first plate disposed in alignment with the slot of the second plate and the plates being disposed along a plate axis, a plurality of guide surfaces being secured with at least one of said plates and disposed between the plurality of plates, the plurality of guide surfaces being disposed proximal to the peripheral surface of the at least one said plate; and
   securing the first and second of the plurality of plates together in a spaced, fixed parallel relationship to one another with the plurality of fingers being movably coupled between the plurality of plates, the plurality of fingers including engagement surfaces disposed to move in a generally radial direction relative to the plurality of plates.

19. The method of claim 18 wherein pivotably coupling the plurality of fingers to the selectively-actuable finger actuator includes pivotably coupling the plurality of fingers to the pivotably-mounted plate, and the method further includes extending an actuating shaft through the pivotably-mounted plate and the plurality of plates.

\* \* \* \* \*